US006708417B1

(12) United States Patent
Wilkins

(10) Patent No.: US 6,708,417 B1
(45) Date of Patent: Mar. 23, 2004

(54) LARGE PANEL SHEATHING SQUARE

(76) Inventor: Neal Wilkins, 1398 Roberson La., Grifton, NC (US) 28530

( * ) Notice: Subject to any disclaimer, the term of this patent is extended or adjusted under 35 U.S.C. 154(b) by 0 days.

(21) Appl. No.: 10/347,256

(22) Filed: Jan. 21, 2003

(51) Int. Cl.[7] .......................... G01B 3/56; B43L 13/00; B43L 9/04

(52) U.S. Cl. ..................... 33/476; 33/27.03; 33/27.032; 33/42; 33/485; 33/494

(58) Field of Search ................................ 33/476, 27.01, 33/27.02, 27.03, 27.031, 27.032, 42, 44, 403, 415, 416, 417, 430, 436, 437, 443, 483, 484, 485, 494

(56) References Cited

U.S. PATENT DOCUMENTS 1,196,519 A * 8/1916 Caylor ........................ 33/476
3,280,465 A * 10/1966 Dolgorukov ................. 33/476
3,491,448 A * 1/1970 Quinton et al. ............ 33/27.01
3,664,025 A * 5/1972 Barto ........................ 33/27.03
4,171,574 A * 10/1979 Gratzl et al. ............... 33/27.03
4,281,572 A * 8/1981 Stovall ........................ 33/443
5,230,158 A * 7/1993 Wall ............................ 33/759
6,070,331 A * 6/2000 Dempsey ....................... 33/42
6,134,797 A * 10/2000 Boyce ......................... 33/464
6,199,288 B1 * 3/2001 Gregory ...................... 33/484
6,216,355 B1 * 4/2001 Darnell .......................... 33/42
6,408,529 B1 * 6/2002 Hodges ....................... 33/429

* cited by examiner

*Primary Examiner*—Christopher W. Fulton
(74) *Attorney, Agent, or Firm*—Mills Law Firm PLLC

(57) ABSTRACT

A framing square for marking transverse, gable, hip/valley cut lines on a large standard sheathing panel includes an elongated rectangular scale with a transverse T-bar handle of equal width having transverse guide surfaces terminating a pivot point at the lateral ends thereof. The scale includes a first set of pitch angle lines for establishing gable cuts extending across the width of the panel and a second set of pitch angle lines for establishing hip/valley cuts. A series of holes are formed in the scale for attaching the scale to the panel at a select radius from a marker carried by the handle for establishing circular cuts.

9 Claims, 9 Drawing Sheets

LARGE PANEL SHEATHING SQUARE

FIELD OF THE INVENTION

The present invention relates to tools for building panels, and in particular, to a layout tool for use in establishing gable, hip/valley and radial cuts on large panel sheathing material.

BACKGROUND OF THE INVENTION

In the construction of residential or commercial buildings, large planar sheets or materials, such as plywood or composites, are used for wall and roof sheathing. The panels are available in standard sizes, typically 4 feet in width and 8 foot in length. On site many of the panels can be installed without cutting. Where side walls merge with roof lines, i.e. gables, and adjoining roof sections intersect, i.e. hips and valleys, the panels must be cut to size for proper fitting and continuity.

The prevalent technique is for the worker to determine one length of the finished panel and determine the other length from standard tables. A fine is drawn between the markings and the panel cut accordingly. Similar techniques are used for both the wall panel and roofing panel layouts and cutting. The task is time consuming and prone to error, particularly for non-skilled workers.

In an effort to reduce the manual and cognitive aspects of large panel construction, a number of layout tools have been proposed. In one approach as disclosed in U.S. Pat. No. 6,199,288 to Gregory an elongated bar is provided with a first pin at a terminal end and a second pin slidable within an elongated slot. The second pin is referenced to pitch legends adjacent the slot to thereby establish the hypotenuse dimension and cutting line when the pins are positioned on opposite sides of the panel. Inasmuch as the width of the panel is variable in normal production, the pin-to-pin layout can result in incorrect layout inclinations. Also, the tool is usable only with full size panels, and does not assist in laying out end panels where the required cut is across less than the full panel width. A similar two-pin layout tool is disclosed in U.S. Pat. Nos. 6,266,889 and 6,147,797 to Boyce.

Other layout tools having capabilities for making beveled cuts have been directed toward dimensional lumber applications, such as rafter, joists, miters and the like 2X. Typical carpenter's squares carrying pitch designations and tables, as disclosed in U.S. Pat. No. 1,196,519 to Caylor, provide at best short length markings that thereafter must be manually extended with supplemental straight edges for use with large panels. This presents the possibility of geometrically increasing errors in the initial layout when translated to larger panels. Similar difficulties are presented in the dimensional lumber layout tools as disclosed in U.S. Pat. Nos. 622,569 to Van Namee and 6,408,529 to Hodges.

SUMMARY OF THE INVENTION

The present invention provides a large panel sheathing tool for laying out beveled, transverse, and circular cuts for directly marking large building panels without the need for supplemental equipment. The sheathing tool comprises an elongated rectangular scale, having a length in excess of the width of a standard panel, carrying a T-bar disposed transverse to the front and rear surfaces thereof with a width the same as the width of the scale. The T-bar, in addition to accurately prescribing normal transverse cuts, provides a pair of pivot points when positioned against an edge of the panel. One surface of the scale includes indicia lines prescribing gable pitches referenced to one of the pivot points. When the designated pitch indicia is aligned with the opposite side of the panel an accurately positioned straight edge extends continuously across the panel for marking the desired cut. The other surface of the scale includes indicia lines referenced to the other pivot point and prescribes hip and valley pitches. The indicia lines extend across the surface and may also be used for making the desired layouts on partial panels. Additionally, the scale includes linear indicia for determining the pivot location for the cut as well as conventional measurements. The scale is further provided with a longitudinal series of holes referenced to the linear indicia and an integral pencil holder at the T-bar. The layout tool may be pivotally attached at a select hole of the desired radius and the scale rotated thereabout to layout circular cuts. Mirror image indicia may be provided for permitting direct layout of reverse inclinations on the panel. Thus, a unitary tool may be used for all the cuts required on large panel material, using continuous surfaces for marking and without the need for moving parts or supplemental equipment. The resultant simplicity and versatility increases productivity and allows lesser skilled workers to accurately layout and cut the large panels.

Accordingly, it is an object of the present invention to provide a tool for marking and making a variety of cuts in large sheathing panels.

Another object of the invention is to provide a layout tool for making gable, hip/valley, transverse, and radial cuts in roofing panels.

A further object of the invention is to provide a layout tool which reduces the time and skill level required to layout and cut large standardized standard size sheathing panels used in residential and commercial construction.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figures 1, 2:
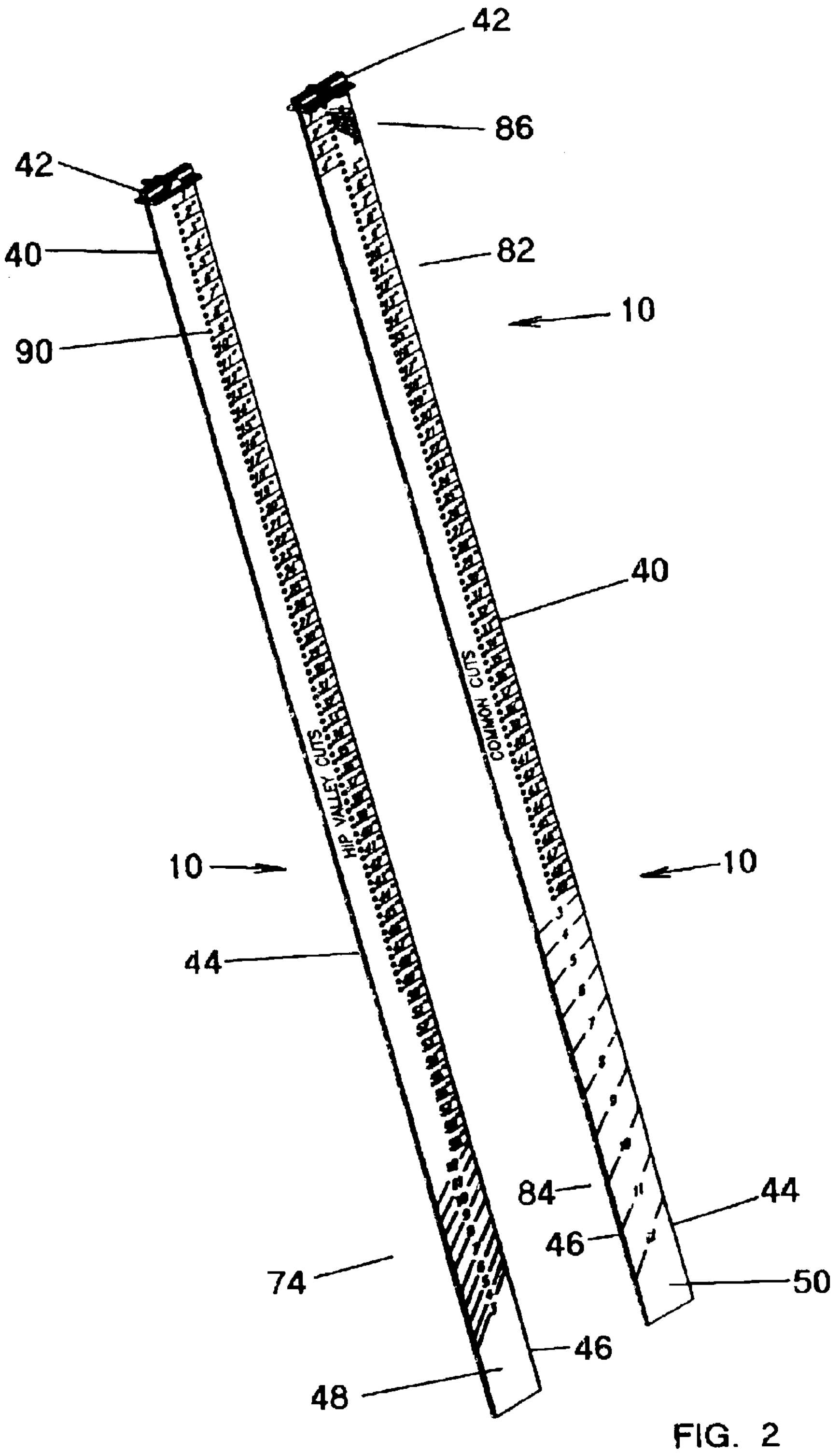
FIG. 1 is a front perspective view of a large panel sheathing square in accordance with a preferred embodiment of the invention.
FIG. 2 is a rear perspective view of the sheathing square shown in FIG. 1.
Figure 3:
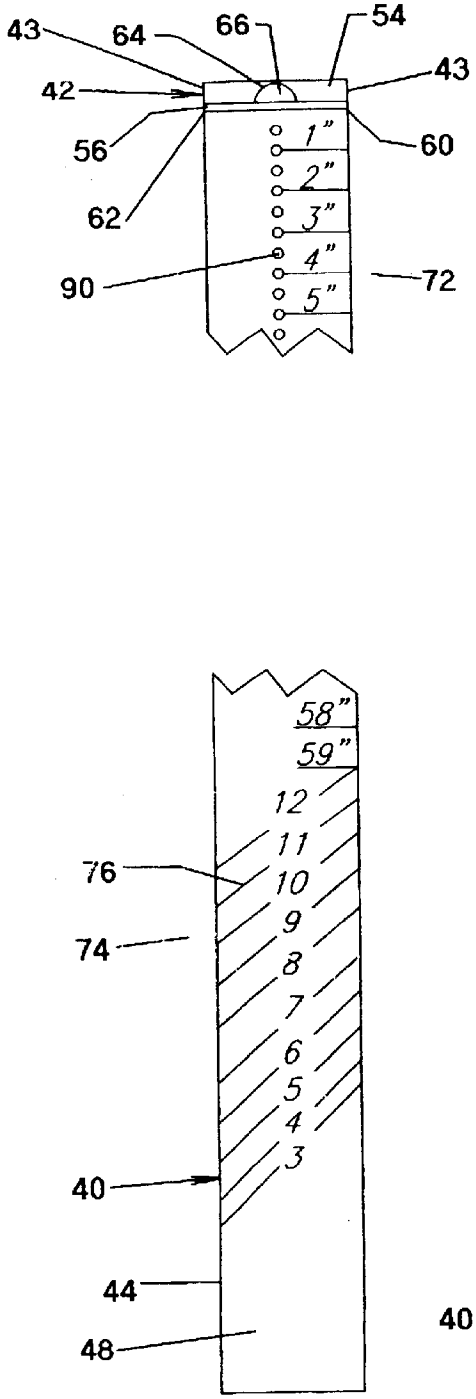
FIG. 3 is a fragmentary front view of the sheathing square.
Figure 4:
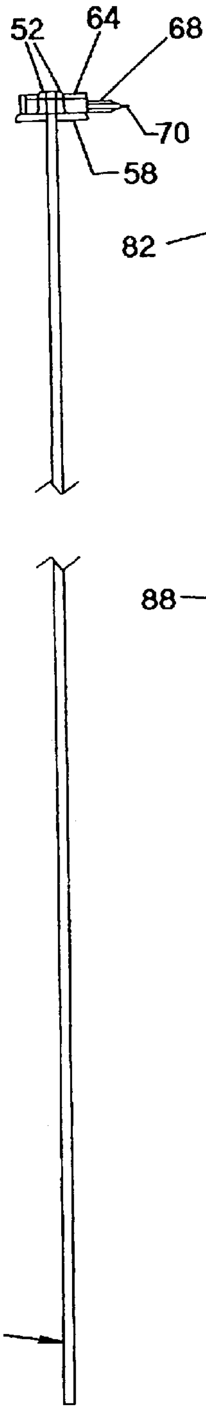
FIG. 4 is a fragmentary side view of the sheathing square.
Figure 5:
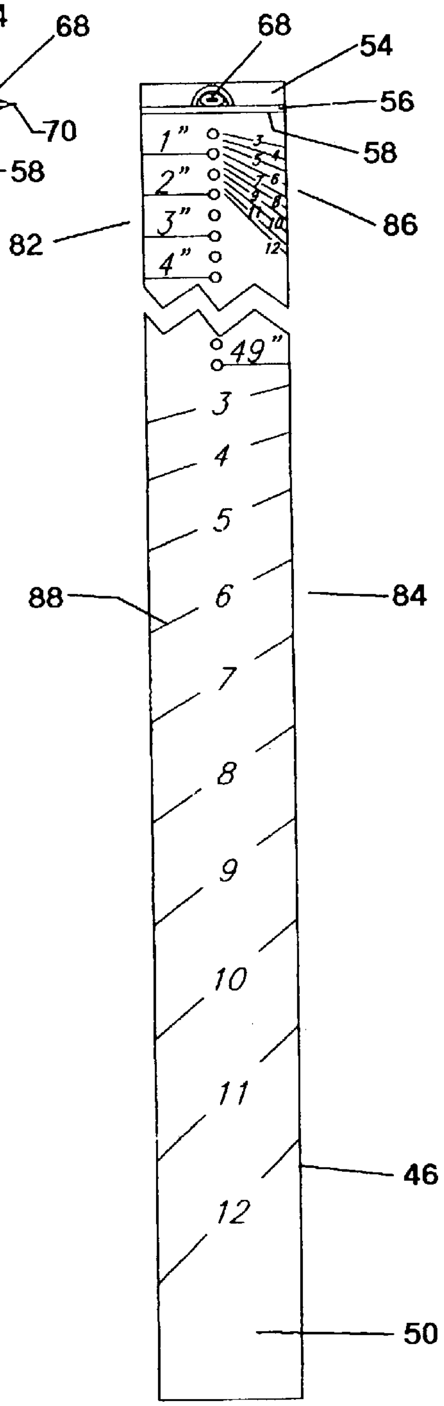
FIG. 5 is a fragmentary rear view of the sheathing square.
Figure 8:
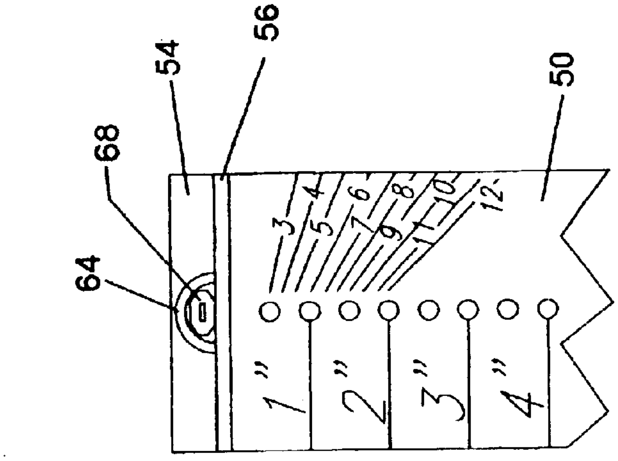
FIG. 8 is an enlarged fragmentary rear view of the handle of FIG. 6.
Figure 7:
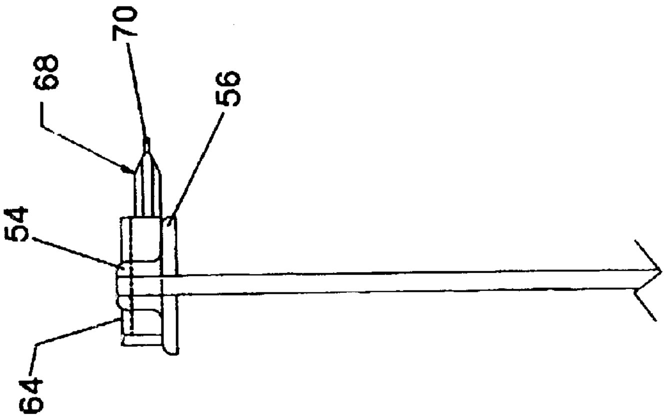
FIG. 7 is an enlarged fragmentary side view of the handle of FIG. 6.
Figure 6:
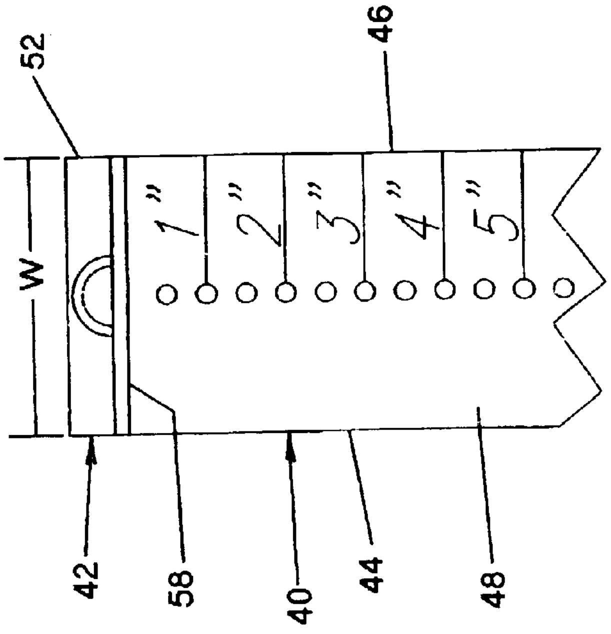
FIG. 6 is an enlarged fragmentary front view of the T-bar handle of the sheathing square.
Figure 9:
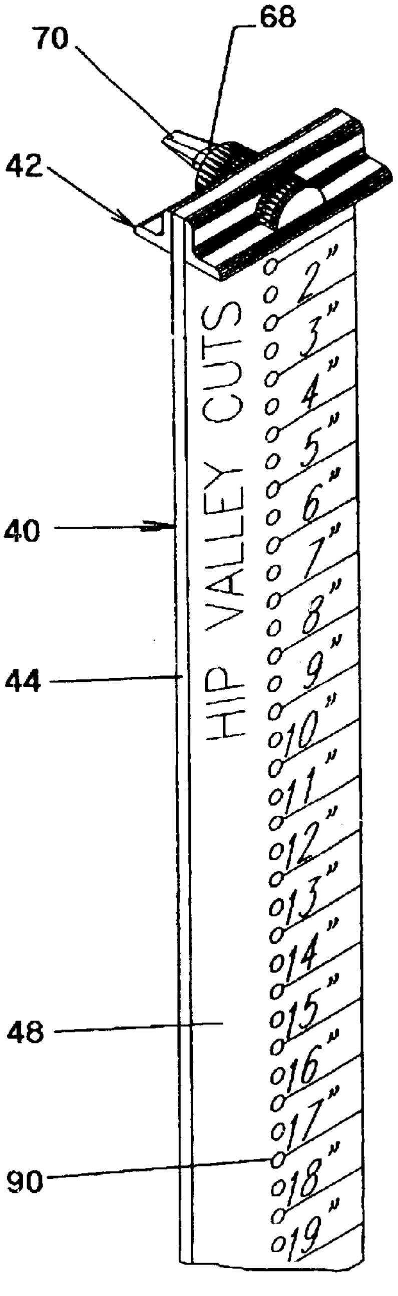
FIG. 9 is an enlarged front perspective view of the handle end of the sheathing square.
Figure 10:
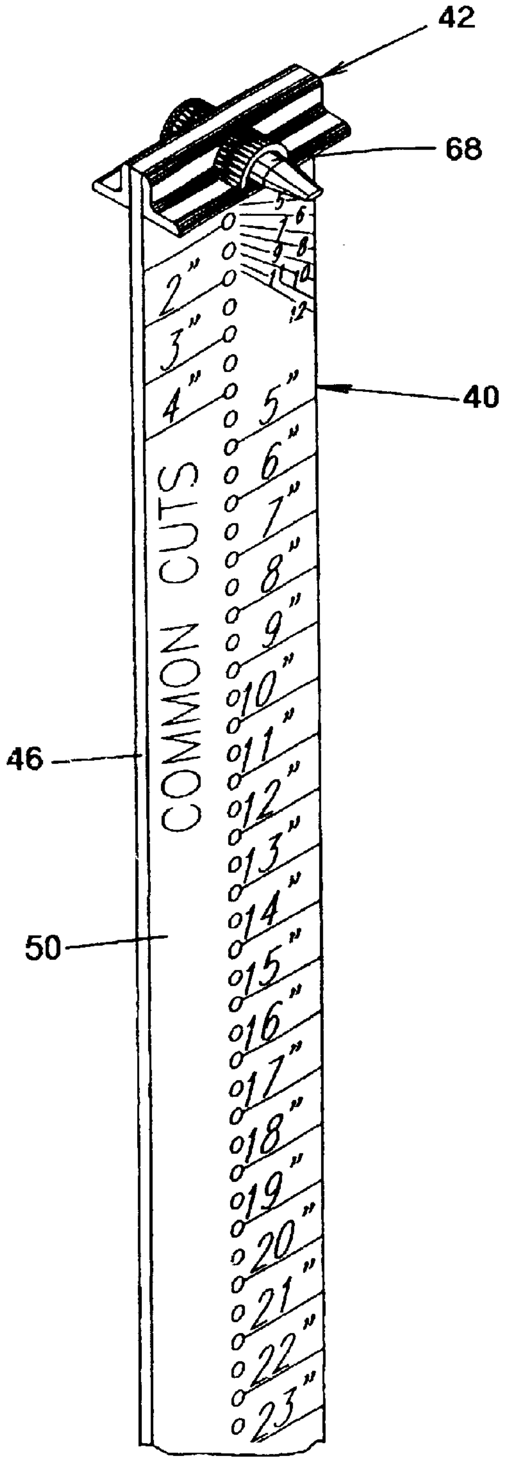
FIG. 10 is an enlarged rear perspective view of the handle end of the sheathing square.

Referring to the drawings for the purpose of describing the preferred embodiment and not for limiting same, FIGS. 1 and 2 illustrate a large panel sheathing square or layout tool 10 for use in the layout of various cut on the large panels typically used in housing construction. The large panels are available in a standard size, generally rectangular 4 feet by 8 sheets and ranging in thickness from about ⅜ inch to ¾ inch. In addition to the layout of transverse and lateral cuts, the tool 10 as described below may be used for the quick, convenient layout of gable, hip and valley, and straight cuts, as well as the layout of circular cuts.

Figure 13:
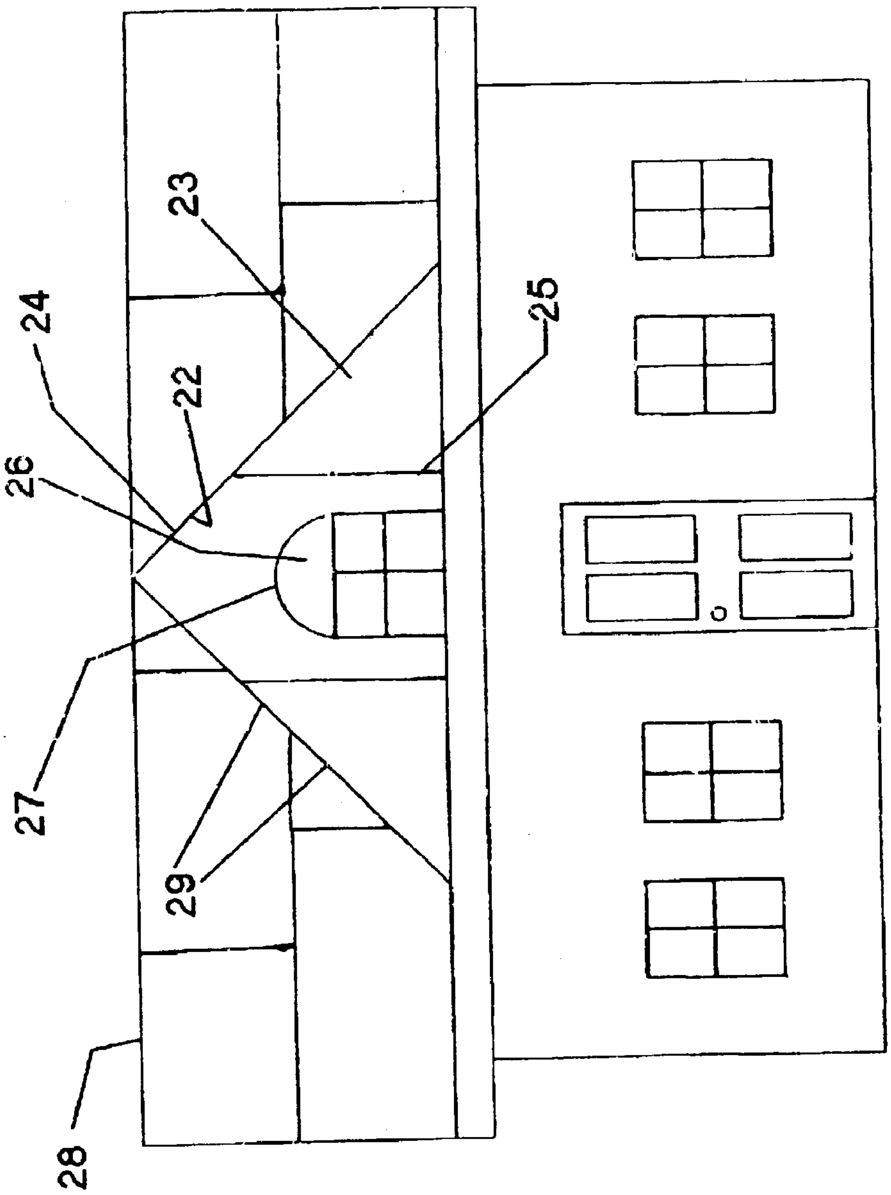
FIG. 13 is an illustrative view of a structure showing the panels formed with the sheathing square.

In a typical housing configuration, as shown in FIG. 13, the vertical walls will involve basically transverse and vertical cuts. For a gable 12, gable cuts 22 in the vertical panels 23 take into account the angle of the gable roof 24. If a gable window is provided, the panel must be appropriately marked and transversely cut 25, and where a semicircular light 26 is provided, a circular cut 27 must be made. Similarly where the main roof 28 intersects the gable, a valley cut 28 takes into account both the main roof pitch and the gable roof pitch.

As shown additionally in FIGS. 3 through 10, each of the foregoing cuts is facilitated by the tool 10, which comprises an elongated rectangular scale or blade 40 having T-bar handle 42. The blade 40 is preferably formed of metal with a thickness of about ¼ inch. The blade has a length substantially greater than the length of the short side of the panel, which allows the various pitches for cuts to be made with a single line. A length of about 5½ to 6 feet is preferred. The blade has a width of about 4 inches, which provides sufficient length for indicia thereon to be aligned with the panel sides during layout. The blade 40 has parallel sides 44 and 46, and a planar front surface 48 and a planar rear surface 50.

The T-bar handle 42 extends mutually perpendicular to the surfaces 48, 50 and sides 44, 46. Importantly, the handle 42 has sidewalls 43 having a width the same as the width of the blade 40. The handle 42 includes a pair of L-shaped sections 52 secured, by mechanical fasteners or bonding, at the ends of the blade 40. Each section 52 has a base leg 54 secured to the surfaces 48 or 50, and front leg 56 perpendicular thereto. The front leg 56 has a planar guide surface 58 mutually perpendicular to the surfaces 48, 50 and the sides 44, 46. The comers at the guide surface 58 and the side walls 43 at the sides 44, 46 establishes laterally spaced side pivot points 60, 62 for the layout measurements as described below.

A semicircular sleeve 64 is formed at the top of the front legs 56 and includes a semicircular opening 66 extending therethrough for receiving and holding a conventional carpenter's pencil 68 having a wedge shaped scribing lead 70.

The front surface 44 of the blade 40 is provided with linear indicia 72 and hip/valley indicia 74. The linear indicia 72 delineate uniformly incremental distances from the guide surfaces for use in establishing and marking linear distances referenced thereto. The hip/valley indicia 74 are in the form of inclined transverse lines 76 extending across the front surface 46 and delineate conventional hip/valley pitches referenced to the pivot point 60 and opposite side of a standard panel.

The rear surface 46 of the blade 40 is provided with linear indicia 82, gable indicia 84, and secondary pitch indicia 86. The linear indicia 72 delineate incremental distances from the guide surfaces 58 to use in establishing and marking linear distances referenced thereto. The gable indicia 84 are in the form of inclined transverse lines 88 extending across the rear surface 46 and delineate convention gable pitches referenced to the pivot point 62 and opposite side of a standard panel. The secondary pitch indicia 86 are referenced to the pivot point 60 and used for the layout of conventional pitches on short lengths of material, such as dimensional lumber.

A plurality of uniformly spaced series of transverse holes 90 are formed through the blade 40 and referenced to each linear indicia 72 and 84. Each hole 90 represents an attachment point for determining a radius for a circular cut when appropriately attached to a panel. Inasmuch as the scribed line is located beyond the guide surface 58, the resulting scribed line is a "heavy" with the circular cut interior thereof and thereby within normal building tolerances.

Figure 11:
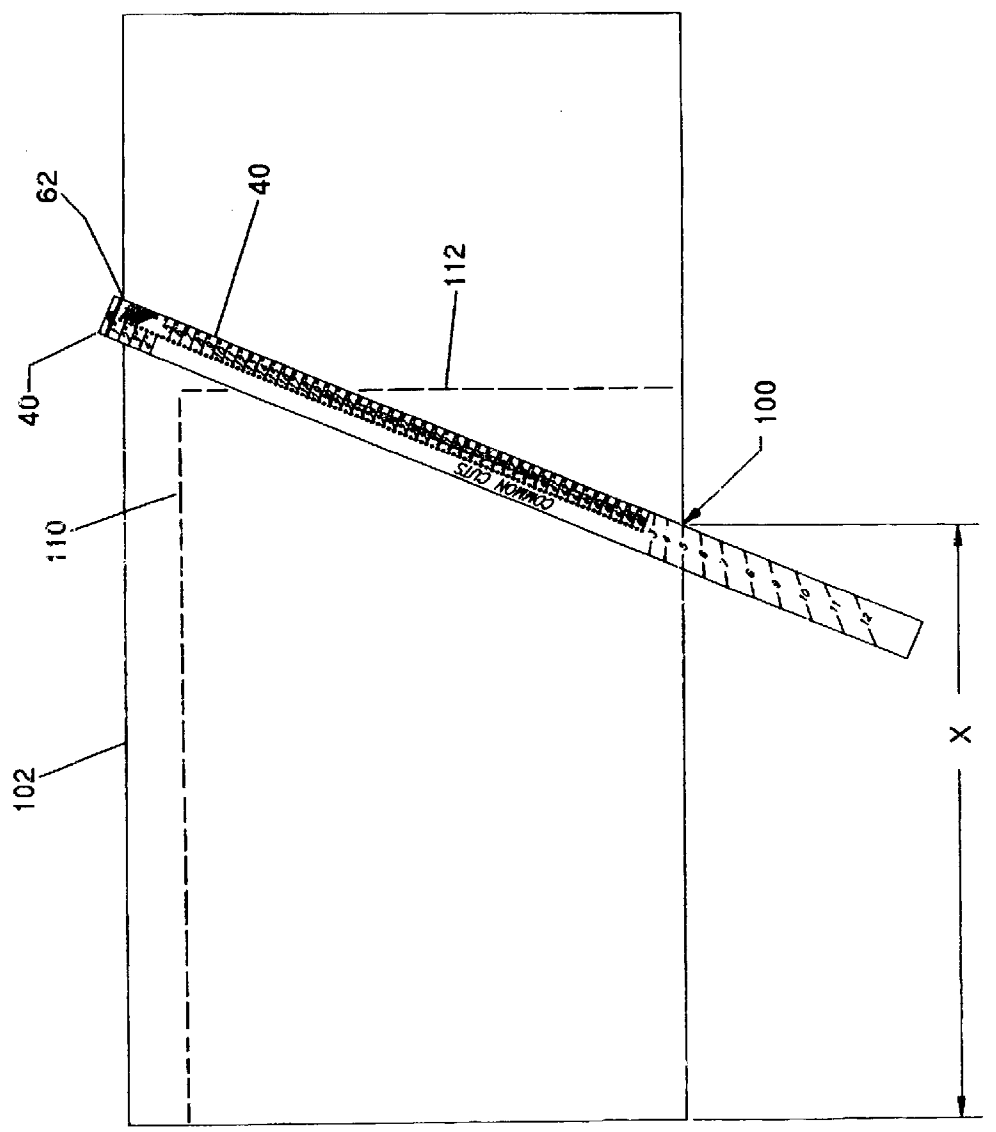
FIG. 11 is a plan view illustrating the use of the sheathing square in establishing a gable cut on full and partial panels.

Referring to FIG. 11, for the layout of a gable cut, the worker establishes a layout mark 100 on one long side of a standard 4×8 sheathing panel 102 in accordance with standard practice. The tool 10 is then oriented with the T-bar handle 42 engaging the top side of the panel at the pivot point and the transverse line for the desired pitch on the gable indicia aligned at the layout mark 100 at the bottom side edge thus establishing the angularity for the selected pitch. The line is then scribed along the edge of the bar 40, and thereafter the panel is cut with an appropriate tool. For partial panels as shown by the dashed lines 110, the transverse line of the desired pitch is aligned with the mark 110 and the lower edge, and the cut line thereafter inscribed. Inasmuch as the transverse line extends entirely across the width of the bar, a sufficiently wide and clearly identified inscription is provided for alignment with the panel edge to permit a cut in the partial panel within accepted building tolerance. It will be appreciated that similar methodology may be employed for the layout of the hip and valley cuts.

Figure 12:
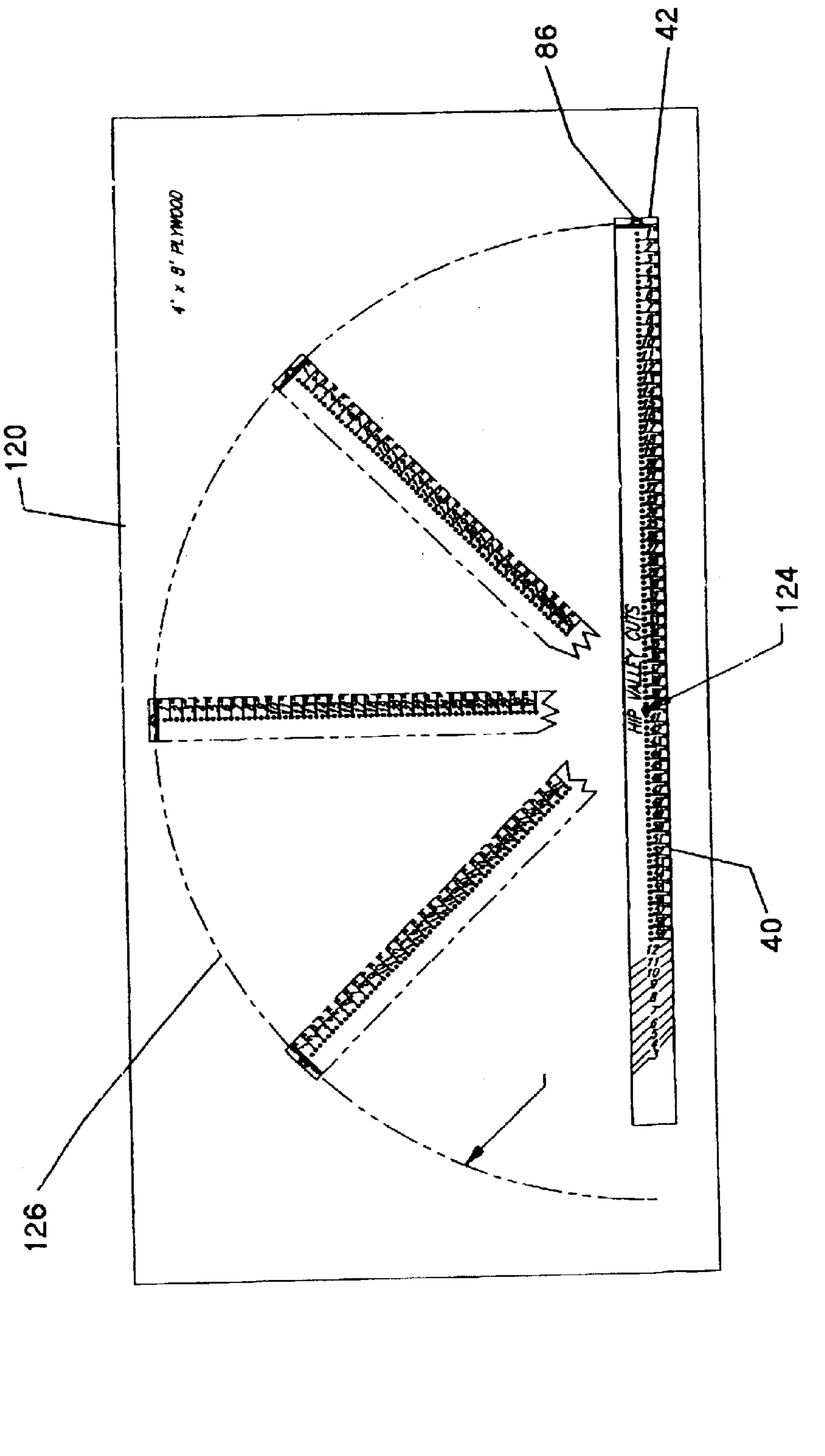
FIG. 12 is a plan view illustrating the use of the sheathing square in establishing a radial cut on a panel.

Referring to FIG. 12, the radial cuts may be made on a panel 120 by marking a pivot point 122 thereon, attaching the blade 40 to the panel 120 a nail 124 at a hole representing desired radius, and rotating the blade 40 about the nail 124 to inscribe a radius on the panel with the marking point of the pencil. The tool is then removed and the radial cut performed with an appropriate tool.

Figure 16:
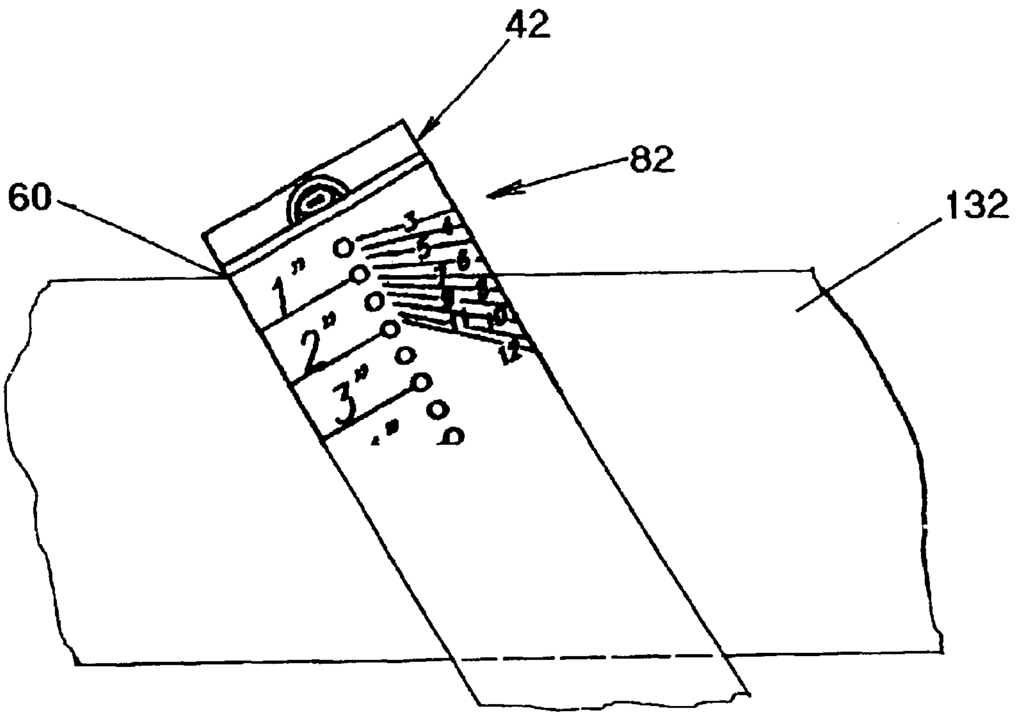
FIG. 16 is a fragmentary plan view illustrating the use of the sheathing square in establishing a beveled cut on dimensional lumber.

Cut on smaller construction items such as dimensional lumber used in establishing the gables and panels may be laid out using the secondary indicia as shown in FIG. 16. Therein the pivot point 60 of the T-bar handle 42 is located at a layout mark and rotated until the selected pitch of the secondary indicia 82 is aligned with the side of a construction component 132, such as 2X lumber. A line is scribed along the side of the blade and the component cut in a conventional manner.

Figure 14:
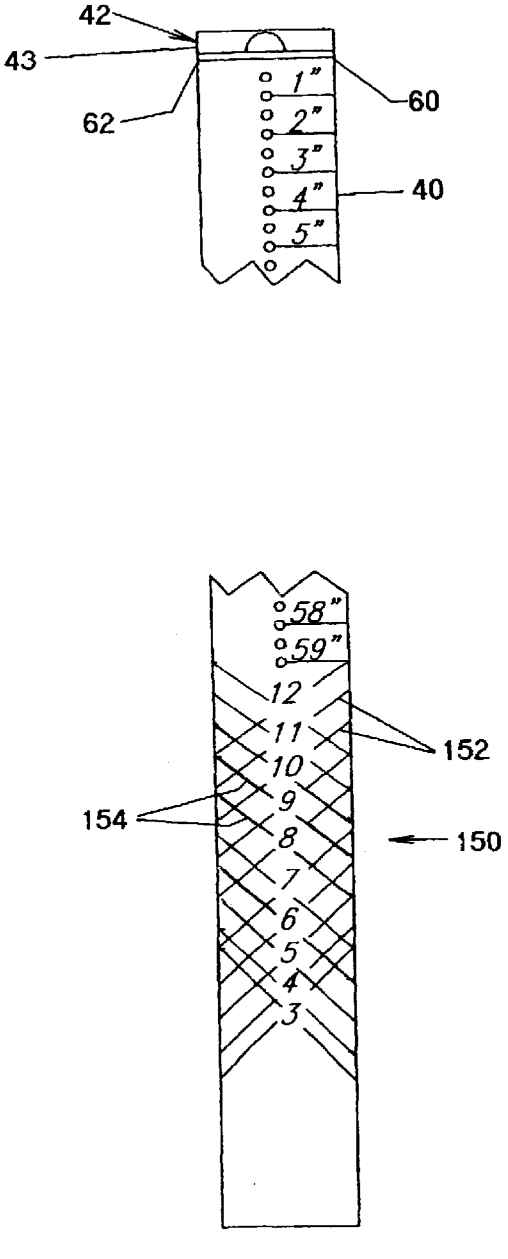
FIG. 14 is a front view of a sheathing square in accordance with an embodiment of the invention.
Figure 15:
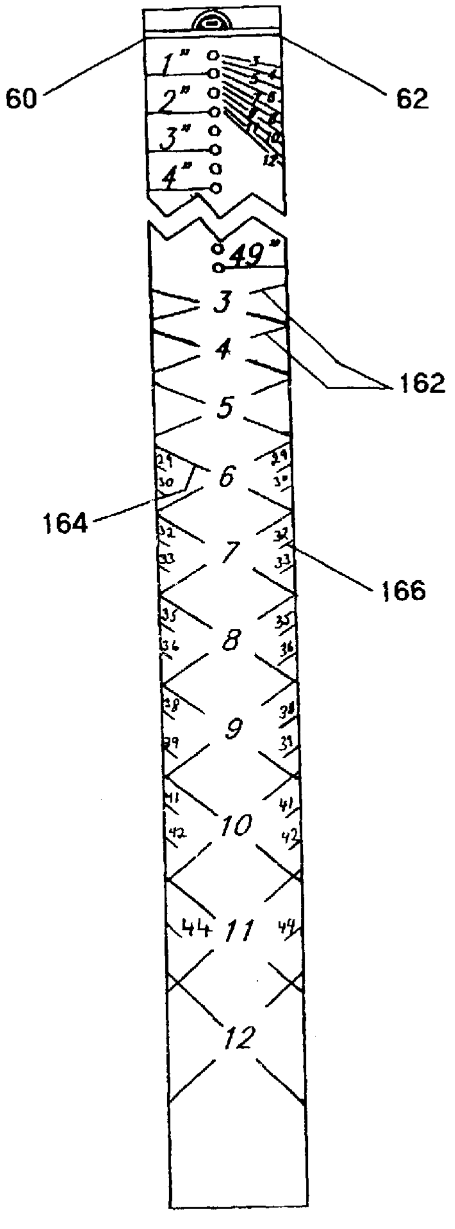
FIG. 15 is a rear view of the sheathing square of FIG. 14.

For the gable, hip and valley layouts as described above, it will be appreciated that the same are inclined toward the right side of the panel as illustrated in FIG. 11. Where an inclination toward the left side of the panel is required, the sheet is reversed and the required layout proceeds from the reverse side of the sheet. FIGS. 14 and 15 illustrate another embodiment wherein the layout tool 150 is provided mirror image indicia for the layout. Therein, the front surface of the scale 40 includes a first pitch indicia 152 referenced to pivot point 60 as in the above described embodiment, and a second pitch indicia 154 referenced to the pivot point 62 for making bidirectional inclined hip/valley cut from the front surface of the panel. Similarly, the rear surface of the scale includes a first pitch indicia 162 referenced to pivot point 62 as in the first described embodiment and a second pitch indicia 164 referenced to the pivot point 60 for making bidirectional inclined gable cuts. Supplemental linear 166 may also be included in area of the pitch delineations.

In view of the foregoing, it will be appreciated that the layout tool 101 of the present invention can be used to accurately layout the gable, and hip/valley cuts used in construction on large panels, both full and partial sized. Moreover, radial cuts and dimensional lumber cuts can also be accomplished.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed:

1. A framing tool for marking a large sheathing panel having a standard width and a standard height to layout transverse, gable, and hip and valley cuts, said tool comprising: an elongated rectangular scale member having laterally spaced sides and front and rear surfaces normal thereto, said scale member having a uniform width and a scale length greater than the standard width of the panel; a handle member attached to one end of said scale member having planar guide surfaces mutually perpendicular to said sides and front and rear surfaces of said scale member, said guide surfaces having a width the same as said width of said scale member and coextensive therewith, the ends of said guide surfaces defining a first pivot point at one of said sides of said scale member and a second pivot point at the other of said sides of said scale member; first indicia formed longitudinally along and on one of said surfaces of said scale member representing uniform incremental distances from guide surfaces; second indicia comprising first lines extending across one of said surfaces of said scale member representing varying pitch angles for marking gable cuts when one of said pivot points engages one lateral side of the panel and a select first line designating a desired pitch is aligned with the opposed lateral side of the panel; and third indicia comprising second lines extending across the other of said surfaces of said scale member representing varying pitch angles for marking hip and valley cuts when said the other of said pivot points engages one lateral side of the panel and a select second line designating a desired pitch is aligned with the opposed lateral side of the panel.

2. The framing tool as recited in claim 1 wherein said handle member comprises a pair of sections attached in opposed relation on said surfaces of said scale member.

3. The framing tool as recited in claim 2 wherein said sections a generally L-shaped with a base leg attached to said scale member and a projecting leg containing said guide surfaces.

4. The framing tool as recited in claim 3 wherein a longitudinal series of holes are formed longitudinally along said scale member and referenced to said first indicia whereby a fastener extending through a select hole and attached to the panel enables pivotal movement of said scale member thereabout.

5. The framing tool as recited in claim 4 wherein said handle member includes means for transversely holding a marking instrument for inscribing a circular line upon said pivotal movement of said scale member.

6. The framing tool as recited in claim 5 wherein said means for transversely holing the marking instrument includes a transverse passage through said handle member.

7. The framing tool as recited in claim 6 wherein said passage has a semicircular opening for receiving a carpenter's pencil.

8. The framing tool as recited in claim 1 wherein said second indicia includes a first grouping referenced to said first pivot point and a second grouping referenced to said second pivot point thereby permitting inscribing right hand and left hand gale gable on the panel.

9. The framing tool as recited in claim 1 wherein said third indicia includes a first grouping referenced to said first pivot point and a second group referenced to said second pivot point thereby permitting inscribing left hand and right hand hip/valley pitches on the panel.

* * * * *